US012678354B2

(12) United States Patent
Yingjie

(10) Patent No.: US 12,678,354 B2
(45) Date of Patent: Jul. 14, 2026

(54) ELECTRIC OFFICE WHEELCHAIR

(71) Applicant: FSC Tech Pte. Ltd., Singapore (SG)

(72) Inventor: Liu Yingjie, Singapore (SG)

(73) Assignee: FSC Tech Pte. Ltd., Singapore (SG)

( * ) Notice: Subject to any disclaimer, the term of this patent is extended or adjusted under 35 U.S.C. 154(b) by 215 days.

(21) Appl. No.: 18/390,840

(22) Filed: Dec. 20, 2023

(65) Prior Publication Data

US 2024/0216192 A1 Jul. 4, 2024

(30) Foreign Application Priority Data

Jan. 3, 2023 (SG) .......................... 10202300002R

(51) Int. Cl.
*A61G 5/04* (2013.01)
*A61G 5/10* (2006.01)

(52) U.S. Cl.
CPC .......... *A61G 5/043* (2013.01); *A61G 5/1059* (2013.01)

(58) Field of Classification Search
CPC ............................ A61G 5/043; A61G 5/1059
See application file for complete search history.

(56) References Cited

U.S. PATENT DOCUMENTS 4,527,829 A * 7/1985 Fanslau .................. A61G 5/085 297/29
5,183,133 A * 2/1993 Roy ....................... A61G 5/043 310/67 R
5,445,233 A * 8/1995 Fernie ...................... B60K 1/00 180/907
2015/0202102 A1* 7/2015 Dunham ............. A61G 5/1059 297/344.13
2017/0252236 A1* 9/2017 Watkins ................. A61G 5/125
2021/0401639 A1* 12/2021 Ozaki ..................... B62K 1/00

* cited by examiner

*Primary Examiner* — Edwin A Young
(74) *Attorney, Agent, or Firm* — Michael E. Dukes; Dentons Cohen & Grigsby, P.C.

(57) ABSTRACT

Disclosed is an electric office wheelchair which can be used as either an office chair or an electric wheelchair. It includes a chair back, a seat, armrests, casters, a support, a chassis, a telescopic device and a driving device. The chair back is connected to the seat. The armrests are connected to the chair back. The upper of the support is connected to the seat, the middle is connected to the chassis and the lower is connected to the telescopic device. The telescopic device is connected to the driving device with two electric wheels.

6 Claims, 2 Drawing Sheets

ELECTRIC OFFICE WHEELCHAIR

CROSS-REFERENCE TO RELATED APPLICATIONS

This applications claims priority to Singapore Patent Application No. 10202300002R, filed Jan. 1, 2023.

TECHNICAL FIELD

This disclosure is under the field of electric wheelchair, in particular, electric office wheelchair.

BACKGROUND

In daily life, handicapped or elderly people often need to use electric wheelchairs when they want to move around. Most of these electric wheelchairs are designed for outdoor use but not focused on home use. This kind of electric wheelchair generally has two front wheels to control the direction and two electric rear wheels. When making a turn, one rear wheel is used as the center of the turning circle, and the front wheels and another rear wheel rotate around the center. Therefore, a turning radius is always required when making a turn. Restricted by this design, these electric wheelchairs usually have to take multiple back and forth movements to make a lateral turn or a reverse turn when it's in a small area.

Furthermore, it is impossible to turn 360° in situ just like a usual office chair. This is inconvenient for office and home use. Therefore, the user experience needs to be improved.

SUMMARY

According to an example of the present disclosure, there is provided an electric office wheelchair comprising a chair back, a seat, arm rests, casters, a chassis, a support, a telescopic device and a driving device electrically controllable to move the electric office wheelchair, wherein an upper part of the chassis is connected to the support, and a lower part of the chassis is equipped with the telescopic device and the driving device, wherein an upper end of the support is connected to the seat, a middle portion of the support is connected to the chassis, and a lower end of the support is connected to the telescopic device, wherein a lower end of the telescopic device is fixedly connected to the driving device, wherein the driving device comprises wheels located directly under the seat and the wheels are electrically controllable to move the electric office wheelchair, and wherein the telescopic device is configured to be extendable and retractable to control the wheels to contact ground and leave the ground.

The wheels may have two electric wheels controllable to rotate in opposite directions at the same time.

The electric office wheelchair may comprise a pressure sensor module for measuring a pressure load value to control the extension and retraction of the telescopic device.

The electric office wheelchair may comprise a control module configured to receive input data of a user's body weight and the telescopic device may comprise an electric pusher, wherein the electric pusher may be configured to maintain the telescopic device at an elongate distance such that the pressure load value is kept between 75% and 85% of the user's body weight.

The electric office wheelchair may comprise limit switches to control elongation length of the telescopic device.

The electric office wheelchair may comprise a joystick for controlling the driving device, and the telescopic device may be configured such that when the joystick is out of use with no operation for a time duration or power is turned off, the telescopic device pulls up the wheels to leave the ground.

Figure 1:
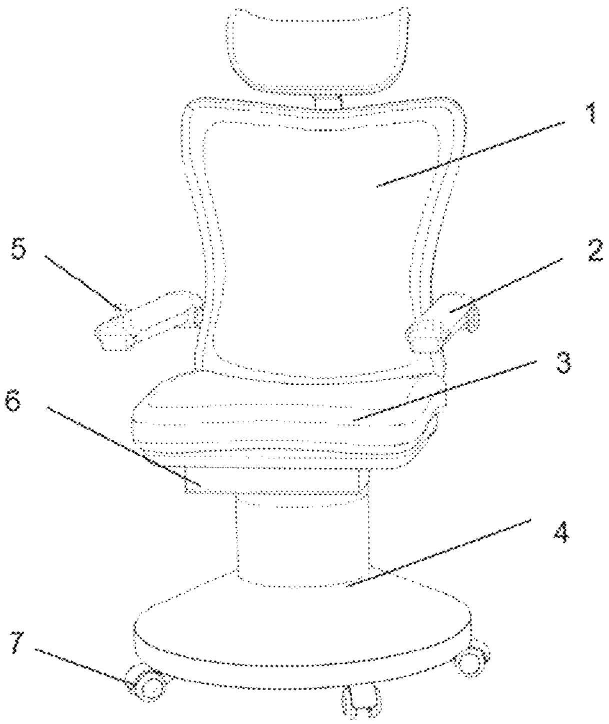
FIG. 1 shows a three-dimensional (3D) diagram of an electric office wheelchair.

Reference numerals: (1) a chair back, (2) armrests, (3) a seat, (4) a chassis, (5) a joystick, (6) a battery and control module, (7) casters, (8) a support, (9) a plane bearing, (10) a cover tube, (11) a pressure sensor, (12) a telescopic tube, (13) a bottom tube, (14) a column tube, (15) an electric pusher, (16) a bridge frame, (17) electric wheels, (18) a platform, (19) chutes, (20) bottom slide-ways, (21) slide-ways, (23) a bottom plate, (24) a pressure sensor module, (25) a telescopic device, (26) a driving device, (27) limit switches, (28) a cover plate, and (29) a bearing plate.

DESCRIPTION IN DETAIL

In order to understand the features and advantages of the invention more clearly, the following will further describe in detail with reference to the drawings and embodiments.

As illustrated in FIG. 1 to FIG. 4, the wheelchair includes a chair back (1), a pair of armrests (2), a seat (3), a chassis (4), a joystick (5), a battery and control module (6), casters (7), a support (8), a telescopic device (25) and a driving device (26).

In FIG. 1, the lower end of the chair back (1) is fixedly connected to the rear end of the seat (3), and the armrests (2) are connected to both sides of the chair back (3). The armrests (2) can be rotated upwards to facilitate users to get up and down. The joystick (5) is mounted at the front end of one armrest (2) and is used to control the electric office wheelchair. The battery and the control module (6) is installed under the seat.

Figure 2:
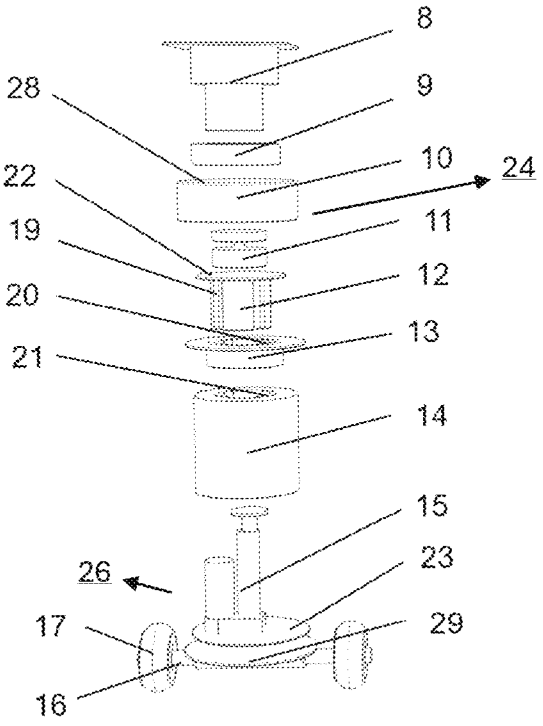
FIG. 2 illustrates an exploded view of the interior of the electric office wheelchair in accordance with one embodiment.
Figure 3:
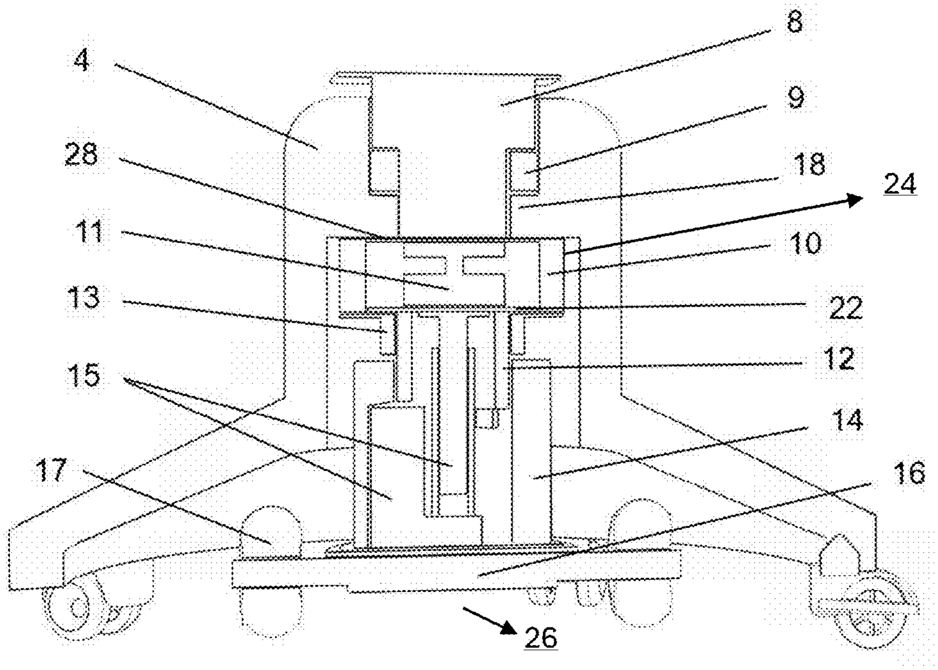
FIG. 3 illustrates a cross-section of the electric office wheelchair in accordance with one embodiment.

FIGS. 2 and 3 show the details of the support (8) and the structure inside the chassis (4). The top of the support (8) is fixedly connected to the seat (3) by a square plate, and the lower part of the square plate is a variable-section cylinder, the variable-section cylinder is divided into two sections, with the diameter of the upper cylinder larger than that of the lower section. The chassis has two parts. The upper part is a cylinder with a vertical cylinder through hole. The cylinder through hole is further divided into three sections, the diameter of the upper section is larger than the middle section. These two sections are corresponded to the two parts of the lower end of the support (8) that is connected to the chassis (4). The middle section is a platform (18) which its top surface is connected to the support by a plane bearing (9). The lower section of the through hole has the largest diameter, and the telescopic device (25) and the driving device (26) are installed here. The lower part of the chassis (4) has the shape of a flat-topped cone (vertical cross-section is trapezium) and an opened space inside. The casters (7) are connected to this part of the chassis (4).

The details of the telescopic device (25) is shown in FIGS. 2 and 3. It includes slide-ways (21), a column tube (14), chutes (19), a telescopic tube (12), a top plate (22), an electric pusher (15) and a bottom plate (23). The few slide-ways (21) vertically pass through the inner surface of the column tube (14) and protrude inwards. The chutes (19) vertically pass through the side walls of the telescopic tube (12) and are sunken inward, corresponding to the slide-ways (21). The slide-ways (21) are able to slide in the chutes (19) and bear the torsion force when the seat rotates. The top plate (22) is located at the upper end of the telescopic tube (12), and is fixedly connected to it. The lower surface of the top plate (22) is fixedly connected to the upper end of the electric pusher (15). The lower end of the telescopic tube (14) and the lower end of the electric pusher (15) are fixedly connected to the bottom plate (23).

FIG. 2 shows the structure of the driving device (26). It includes a bridge frame (16), a bearing plate (29) and electric wheels (17) (i.e. electrically controllable wheels). The upper surface of the bearing plate (29) is fixedly connected to the bottom plate (23) of the telescopic device (25), and the lower surface is fixedly connected to the bridge frame (16). There are two electric wheels (17), which are connected to the two ends of the bridge frame (16).

In one feasible embodiment, as illustrated in FIGS. 2 and 3, the present invention also includes a pressure sensor module (24). It includes a cover plate (28), a cover tube (10), a pressure sensor (11), and a bottom tube (13). The upper surface of the cover plate (28) is fixedly connected to the support (8) which pass through the through hole of the chassis (4), and the lower surface is fixedly connected to the upper surface of the pressure sensor (11). The cover plate (28) is fixedly connected to the top of the cover tube (10). The bottom of the cover tube (10) is fixedly connected to the bottom tube (13). The bottom tube (13) includes bottom slide-ways (20) and a cylindrical tube. The bottom slide-ways (20) are corresponded to the chutes (19), and pass through the inner side walls of the cylindrical tube and protrude inwards. The lower surface of the pressure sensor (11) is fixedly connected to the top plate (22) of the telescopic device passing through the bottom tube (13). The pressure sensor (11) can measure the pressure value between the support (8) and the telescopic device (25).

When in use, turn on the power, operate the joystick (5), and the electric pusher (15) automatically pushes the telescopic tube (12) to extend along the slide-ways (21). At this time, the top of the electric pusher (15) is connected to the pressure sensor (11) through the top plate (22) to lift up the seat (3) and the bottom of the electric pusher (15) pushes down the wheels (17) to contact the ground and support the main load of the user. The pressure sensor (11) can measure the pressure load value transmitted by the seat (3). When the electric pusher (15) maintains an appropriate elongation distance so that the load value is kept between 75% and 85% of the user's body weight, the electric wheels (17) support the seat against the ground and bear the main load. Meanwhile, the seat (3) is moderately lifted but the casters (7) are still in contact with the ground to balance and support the weight of the wheelchair too. The electric office wheelchair can move and turn under the drive of the electric wheels (17). More importantly, the electric wheels (17) is located directly under the seat (3), which means that the vertical axis of symmetry of the two electric wheels (17) is in line with the vertical axis of the support (8). This driving method could be more flexible than the four-wheel electric wheelchair. When the two electric wheels (17) rotate in opposite directions at the same time, it allows the seat (3) to complete a 360° turn in situ like an office chair. When the joystick (5) is out of use (no operation for 5 seconds or longer) or the power is turned off, the telescopic tube (12) automatically shrinks and pulls up the electric wheels (17) to leave the ground. At this time, the wheelchair can be used as an office chair. Furthermore, considering the difference or the changes of the user's weight, the user's weight data need to be input into the control module (6) before use. When the change of user's weight is less than 10%, the data does not need to be corrected. If the change is larger than 10%, the data should be modified.

Figure 4:
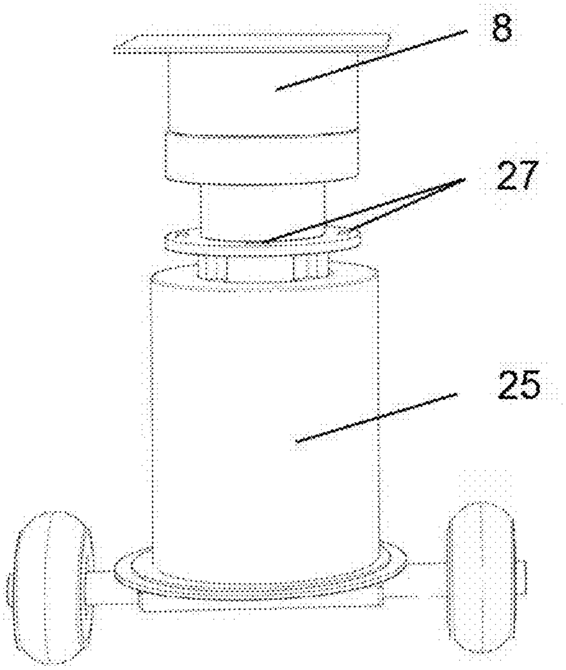
FIG. 4 shows a 3D diagram of the interior of the electric office wheelchair in accordance with another feasible embodiment.

In another feasible embodiment, as illustrated in FIG. 4, this invention also includes limit switches (27). The limit switches (27) are installed on the outer ring of the top plate of the telescopic device (25). The lower section of the support (8) passes through the through hole of the chassis (4) and is fixedly connected to the top plate (22) of the telescopic device. The top plate (22) is installed with an appropriate gap between the lower end of the platform (18). When the telescopic tube (12) is extended moderately and lifts the support (8) up, the limit switches (27) will be triggered to stop elongation by touching the lower end of the platform (18). Meanwhile, the casters (7) keep in touch with ground and still play a role of balance and auxiliary supporting. The rest are the same as the above embodiment and will not be repeated here.

The present electric office wheelchair is more agile than other electric wheelchairs and has a simple and compact structure. It is more suitable for office and home use.

In summary, this invention is designed to provide an electric wheelchair that is more suitable for home and office use. It includes a chair back, a seat, a support, a pair of armrests, a joystick, a chassis, casters, a battery and control module, a telescopic device and a driving device.

The lower end of the chair back is fixedly connected to the rear end of the seat. The armrests which can be lifted up are connected to the sides of the chair back. The joystick is mounted on the front part of one of the armrests. The battery and control module is installed under the seat. The top of the support is fixedly connected to the seat. The chassis has two parts. The upper part is a cylinder with a vertical cylinder through hole. There is a platform in the middle of the through hole which the support stands on. The lower part of the chassis has the shape of a flat-topped cone (vertical cross section is trapezium). The casters are connected to this part of the chassis. The telescopic device includes slide-ways, a column tube, sliding chutes, a telescopic tube, a top plate, an electric pusher and a bottom plate. The few slide-ways vertically pass through the inner surface of the column tube and protrude inwards. The chutes vertically pass through the side walls of the telescopic tube and are sunken inward, corresponding to the slide-ways. The slide-ways are able to slide in the chutes. The telescopic tube and the electric pusher are fixedly connected to the bottom plate.

The driving device includes a bridge frame, a bearing plate and electric wheels. The bearing plate is fixedly connected to the bottom plate of the telescopic device.

In one feasible embodiment, the invention includes a pressure sensor module, containing a cover plate, a cover tube, a pressure sensor, and a bottom tube. The cover plate is fixedly connected to the cover tube which is connected to the bottom tube. The top surface of the cover plate is connected to the bottom of the support. The below surface is connected to the pressure sensor, which is further connected to the top of the telescopic device at its bottom.

In another feasible embodiment, the invention also includes limit switches which would be installed on the top of the telescopic device. The top plate of the telescopic device is connected to the bottom of the support.

The invention is designed to be both an electric wheelchair and an office chair. When in use, turn on the power and control the joystick, the telescopic device would automatically extend. The top of the telescopic device would lift up the seat and the bottom of the telescopic device pushes the electric wheels to stand on the ground. By using either the pressure sensor or the limit switch to control the length of the telescopic tube so that the electric wheels would bear the mean weight of the seat while the casters are still in contact with the ground to balance the wheelchair. At this time, the wheelchair can move around with the aid of the electric wheels. When the joystick is not in use or the power is turned off, the electric wheels will be lifted up and the chair can be used as an office chair.

The present electric office wheelchair is more agile than other electric wheelchairs and has a simple and compact structure. It is more suitable for office and home use.

The present invention has been described by means of embodiments, and those skilled in the art will appreciate that changes or equivalent substitutions can be made to these features and embodiments without departing from the spirit and scope of the present invention. In addition, under tutoring from the invention, the features and examples may be modified to adapt a particular situation without departing from the scope of the invention. Therefore, the present invention is not limited by the specific embodiments disclosed here, and all embodiments falling within the scope of the claims belong to the protection scope of the present invention.

The invention claimed is:

1. An electric office wheelchair comprising:

a chair back, a seat, arm rests, casters, a chassis, a support, a telescopic device, and a driving device electrically controllable to move the electric office wheelchair, wherein an upper part of the chassis is connected to the support, and a lower part of the chassis is equipped with the telescopic device and the driving device, wherein an upper end of the support is connected to the seat, a middle portion of the support is connected to the chassis, and a lower end of the support is connected to the telescopic device, wherein a lower end of the telescopic device is fixedly connected to the driving device, wherein the driving device comprises wheels located directly under the seat and the wheels are electrically controllable to move the electric office wheelchair, and wherein the telescopic device is configured to be extendable and retractable to control the wheels to contact ground and leave the ground.

2. The electric office wheelchair of claim 1, wherein the wheels have two electric wheels controllable to rotate in opposite directions at the same time.

3. The electric office wheelchair of claim 1, wherein the electric office wheelchair comprises a pressure sensor module for measuring a pressure load value to control the extension and retraction of the telescopic device.

4. The electric office wheelchair of claim 3, wherein the electric office wheelchair comprises a control module configured to receive input data of a user's body weight and the telescopic device comprises an electric pusher, wherein the electric pusher is configured to maintain the telescopic device at an elongate distance such that the pressure load value is kept between 75% and 85% of the user's body weight.

5. The electric office wheelchair of claim 1, wherein the electric office wheelchair comprises limit switches to control elongation length of the telescopic device.

6. The electric office wheelchair of claim 1, wherein the electric office wheelchair comprises a joystick for controlling the driving device, and the telescopic device is configured such that when the joystick is out of use with no operation for a time duration or power is turned off, the telescopic device pulls up the wheels to leave the ground.

* * * * *